(No Model.)
J. CISSELL.
ANIMAL TRAP.
No. 392,185. Patented Nov. 6, 1888.
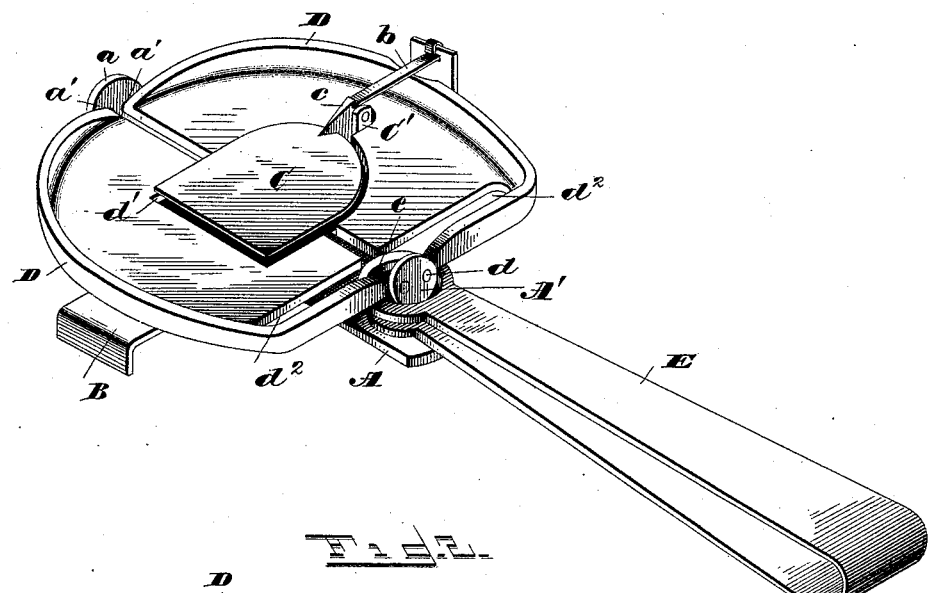
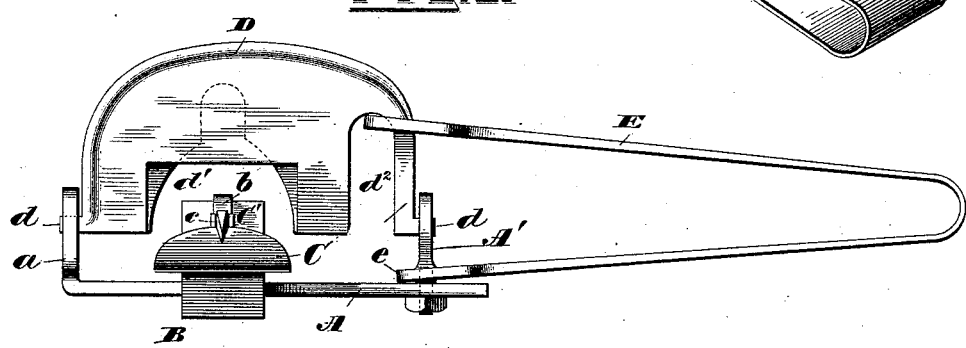
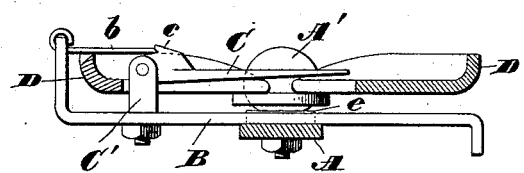
WITNESSES.
G. S. Elliott.
E. M. Johnson
John Cissell.
INVENTOR,
by
Attorney.

United States Patent Office.

JOHN CISSELL, OF GOLDEN LAKE, ARKANSAS.

ANIMAL-TRAP.

SPECIFICATION forming part of Letters Patent No. 392,185, dated November 6, 1888.

Application filed September 13, 1888. Serial No. 285,313. (No model.)

*To all whom it may concern:*

Be it known that I, JOHN CISSELL, a citizen of the United States of America, residing at Golden Lake, in the county of Mississippi and State of Arkansas, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in animal-traps.

In traps of this character as heretofore constructed the jaws have been of skeleton form, and experience has shown that an animal, when caught, will release itself from the trap by gnawing off the limb just below the point confined, and never above it.

One object of my invention is to so construct the jaws of the trap as to prevent access to the limb below the point confined.

Another object of the invention is to prevent the accidental accumulation of rubbish beneath the trap platform or trigger.

With these and minor objects in view the invention consists in novel features of construction and combinations, to be hereinafter described and claimed.

In the accompanying drawings, Figure 1 is a perspective view showing my improved trap set. Fig. 2 is a side elevation of the same sprung. Fig. 3 is an end view showing the trap set.

The frame-work of the trap consists of two metallic pieces, A and B, crossing each other at right angles and bolted together at the point of intersection. The piece or strip A is provided at one end with an upturned lug, $a$, having two eyes, $a'$, in which are journaled the trunnions $d$, formed on one end of the jaws D, the trunnions at the other end of the jaws being journaled in eyes formed in a lug, A', secured near the other end of the strip A. The other strip, B, is also upturned at one end and provided with a transverse slit, in which is secured one end of a dog, $b$, the other or free end of which is adapted to engage the notched heel $c$ of the trigger-plate C. This trigger-plate C is at the heel journaled within the forked upper end of a post, C', secured to the strip B at a proper distance from its upturned end.

The jaws D are of the usual contour, but differ from those now known, in that they are solid plates from the rim inward, a central recess, $d'$, being formed in each plate to provide for the reception of the trigger C when the trap is set, and side slots, $d^2$, to admit of the rise of the eye $e$ of spring E to spring the trap. Owing to this construction, it will be seen that when the trap is set the jaws and trigger-plate C form practically a solid platform that will prevent sticks or other rubbish from working under the trigger to interfere with its proper operation. By the use of the solid jaws an animal caught is less liable to free itself from the trap, as the limb confined is inclosed between the solid webs of the jaws and cannot be reached below the point confined, and the limb cannot be freed, as the jaws of the trap hold the bone firmly.

I claim—

1. In an animal-trap of the character described, the combination of the frame, the pivoted trigger-plate and its dog, the spring, and the jaws having a solid centrally recessed web to form a platform when the trap is set, substantially as described.

2. In an animal-trap of the character described, the combination of the frame, the pivoted trigger-plate and its dog, the spring, and the jaws having an inwardly-extending web to prevent access below the jaws when the trap is sprung, substantially as described.

In testimony whereof I affix my signature in presence of two witnesses.

JOHN CISSELL.

Witnesses:
W. P. HALE,
HUGH R. MCVEIGH.